Figure 1:
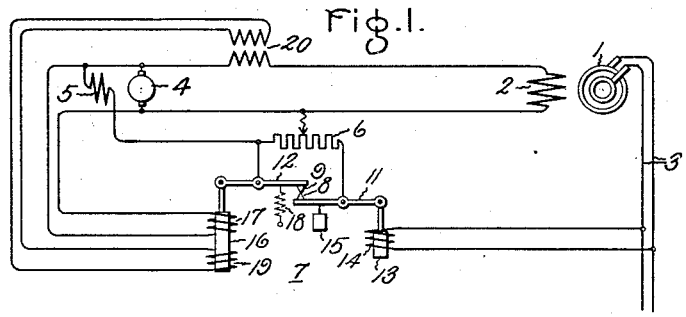

Sept. 9, 1930.  F. H. CLOUGH ET AL  1,775,514

ELECTRICAL REGULATOR

Original Filed Jan. 28, 1928

Inventor:
Frederick H. Clough
Henry W. Taylor
by Alexander S. *****
His Attorney Patented Sept. 9, 1930

1,775,514

UNITED STATES PATENT OFFICE

FREDERICK H. CLOUGH, OF KILSBY, AND HENRY W. TAYLOR, OF RUGBY, ENGLAND, ASSIGNORS TO GENERAL ELECTRIC COMPANY, A CORPORATION OF NEW YORK

ELECTRICAL REGULATOR

Application filed January 28, 1928, Serial No. 250,312, and in Great Britain February 7, 1927. Renewed January 8, 1930.

Our invention relates to electrical regulators and more particularly to regulators of the vibratory type for controlling the excitation of synchronous dynamo-electric machines.

Studies accompanying the advent of extensive power transmission systems have disclosed that the excitation of the synchronous machines of a power transmission system plays an important part in the problem of system stability and that it is desirable to obtain for any new load condition in the system the desired change in excitation in a time sufficient to prevent a voltage change at the synchronous machines great enough to cause instability or loss of synchronism between the synchronous machines of the system.

It is an object of our invention to provide an improved regulator and system of regulation for the synchronous equipment of power transmission systems for improving stability of operation.

A further object of our invention is to provide improved means for modifying the action of the contacts of a vibratory type of regulator utilized in connection with a dynamo-electric machine when said machine is subjected to sudden load changes.

A still further object of our invention is the provision of improved means to stay the motion of the contacts of a vibratory type of regulator utilized in connection with a synchronous dynamo-electric machine when said machine is subjected to sudden load changes.

In the application of our invention to a synchronous dynamo-electric machine in which a vibratory type of regulator is used to control the field voltage by the intermittent short circuiting of a regulating resistor in the field circuit, it is the intention that if the load is suddenly increased the movement of the contacts shall be stayed so that they remain closed until the exciter voltage has risen to a suitable higher value, and if the load is suddenly removed it is the intention that the motion of the contacts shall be stayed so that they remain apart until a new suitable lower value has been reached. We use as the basis of our invention the well known fact that with every change of load at the stator terminals of a synchronous machine, an impulse of current is generated in the rotor windings by virtue of their mutual relation to the stator coils. Upon the occurrence of a sudden increment of load, there is, even with constant excitation voltage, a transient increase in current, and upon the occurrence of a sudden decrement of load there is a decrease in the value of the rotor current. We, therefore, utilize the transient variations of current in the excitation circuit of a dynamo-electric machine to modify the motion of the contacts of a vibratory regulator in the manner previously outlined.

Figure 2:
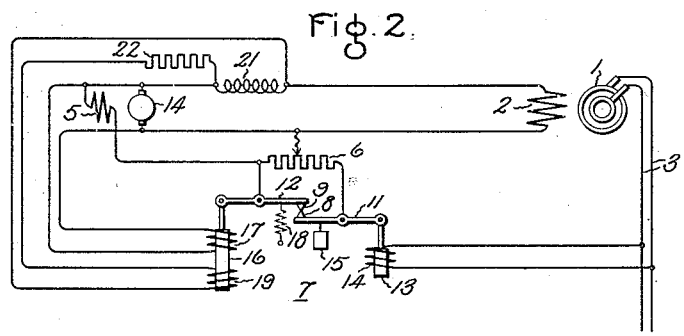
Figure 3:
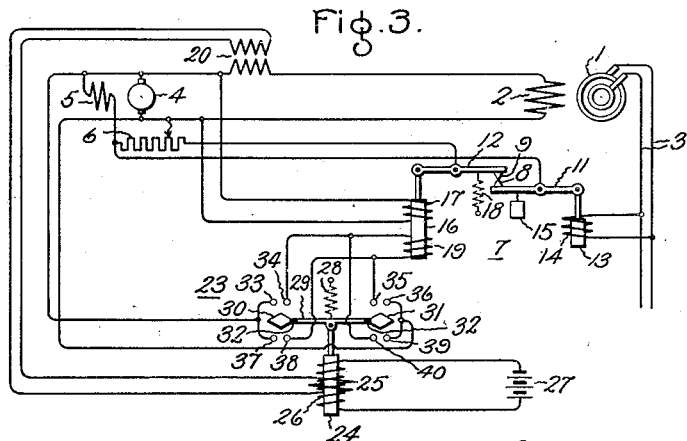

The novel features which we believe to be characteristic of our invention are set forth with particularity in the appended claims, the invention itself, however, both as to organization and method of operation together with further objects and advantages thereof will best be understood by reference to the following description taken in connection with the accompanying drawing in which Fig. 1 is a diagrammatic illustration of a regulator embodying our invention, and Figs. 2 and 3 illustrate modifications of the arrangement shown in Fig. 1.

Referring to the figures of the drawing wherein we have shown regulating systems for alternating current generators and wherein similar parts are designated by similar reference characters, 1 denotes a synchronous dynamo-electric generator having a field winding 2 and connected to a distribution circuit 3. The field winding 2 is connected to be energized by an exciter 4 which is provided with a field winding 5. The field winding 5 is connected in series with an adjustable resistance 6 across the armature of exciter 4. A regulator 7 comprising cooperating contacts 8 and 9 is provided for controlling the exciter voltage and thereby the voltage of generator 1. For simplicity of illustration, these contacts are shown operating directly across the resistor 6 but the well known intermediate relay may be preferred in practice and may be used without departing from our invention in its broader aspects. Contacts 8 and 9 are supported on pivoted contact arms 11 and 12 respectively. The movement of arm 11 is controlled by an electromagnet comprising a plunger 13 mechanically connected thereto and a winding 14 which is connected to be energized in accordance with an electrical characteristic of generator 1 and as shown is connected to be responsive to the voltage across circuit 3. The weight of plunger 13 and the pull of winding 14 are balanced by any suitable means such as the weight 15. The movement of arm 12 is controlled by an electromagnet having a plunger 16 connected thereto and a winding 17 connected to be energized in accordance with an electrical characteristic of the excitation circuit of generator 1 and as shown is connected to be responsive to the voltage of exciter 4. The pull of the winding 17 is balanced by suitable springs indicated by spring 18.

It is desirable to briefly outline the operation of the arrangement so far described. Consider the sequence of events for a fixed position of lever 11. If the exciter voltage is initially zero the pull of winding 17 will be zero and the spring 18 having no opposition will close contacts 8 and 9 thereby short circuiting resistance 6. After a certain time the exciter voltage will become great enough to make the pull of winding 17 greater than the pull of spring 18, thereby opening the contacts and the circuit in shunt to resistance 6. This inserts resistance 6 in the exciter field circuit and the exciter voltage starts to decrease. When it has decreased to a certain value the pull of winding 17 is again less than the pull of spring 18 and the contacts 8 and 9 close again and remain closed until the pull of winding 17 is again greater than the pull of spring 18. Thus, for a fixed position of arm 11 the exciter voltage will periodically vary between two values and a certain average value will be obtained. This average value of exciter voltage will cause a certain voltage to exist at the terminals of generator 1, and if this voltage is of the proper value to balance arm 11 the operation will continue in the manner described above.

When generator 1 is subjected to a change in load and is equipped with the regulating arrangement outlined above, the contacts of the regulator tend to continue to beat and thus cause a delay in the time which will be taken to readjust the generator voltage. In accordance with our invention we stay the beat of the contacts immediately a change in load takes place and until the required new average value of field excitation is obtained to restore and maintain the regulated electrical characteristic at the predetermined value.

In the embodiment of our invention shown in Fig. 1 of the drawing, an additional winding 19 is associated with plunger 16 and winding 17. This additional winding is connected to be energized from a current transformer 20, the primary winding of which is connected in series relation with the field winding 2 of generator 1.

When the load on generator 1 is suddenly increased, there will be an impulse of current in the field circuit 2. By means of the current transformer 20, a corresponding impulse of current will pass through the winding 19. The winding 19 is so connected that under these conditions it neutralizes the magnetizing effect of the current in winding 17 and the pull of core 16 will be released. Contacts 8 and 9 are brought into engagement and remain in engagement so long as the impulse from the current transformer persists. In this way the resistance 6 will be immediately short-circuited and the excitation of generator 1 will be promptly adjusted to the new value required to maintain the voltage constant. If, on the other hand, the load on generator 1 is suddenly decreased, there will be an impulse of current in the excitation circuit in the reverse direction to the normal flow of excitation current. There will, accordingly, be a current in winding 19 in the reverse direction to that in the case previously considered, so that the currents in windings 17 and 19 now act accumulatively. The pull on the core 16 is consequently increased and contacts 8 and 9 are immediately opened, so that resistance 6 is at once placed in the field circuit of exciter 4 and the excitation of generator 1 is speedily adjusted to the predetermined value.

Fig. 2 shows a modification for obtaining the impulse current from the generator excitation circuit. In this modification, 21 is an inductance of low resistance and 22 is a resistance of low inductance. The resistance 22 and the coil 19 are connected in series relation in a parallel circuit with the inductance 21 which is connected in series relation with field winding 2 of generator 1. In this case current will always flow through coil 19 under steady load conditions but the pull due to this current will be balanced by the spring 18. In the event of change of load and an impulse current starts to flow in one direction or the other, the greater part of the impulse current will flow through the circuit formed by the resistance 22 and the coil 19, and the action on the contact 9 will be the same as previously described with reference to Fig. 1.

Fig. 3 shows a further modification of the arrangement shown in Fig. 1. In this arrangement 20 is the current transformer of Fig. 1 with its primary winding connected in series relation with the field winding 2 but its secondary winding is now connected to control the operation of a relay 23 which is arranged to control the energization of coil 19. Relay 23 includes a magnetic member or core 24 which is influenced by windings 25 and 26 respectively. Winding 25 is connected to be energized from the secondary winding of transformer 20 and winding 26 is connected to be energized from a constant source of direct current indicated by the battery 27 for constantly magnetizing the core 24. The pull corresponding to the constant magnetization of the core 24 by the winding 26 is counterbalanced by a spring 28. An arm 29 is attached to core 24 and carries contact members 30 and 31 which are insulated therefrom by suitable insulating means 32. When core 24 is moved to its upper position the contact members 30 and 31 bridge contacts 33 and 34, and 35 and 36, respectively, and when core 24 is moved to its lower position contact members 30 and 31 bridge contacts 37 and 38, and 39 and 40, respectively. Contacts 33 and 37 are connected to one side of a suitable source of energy, such as the exciter 4 as shown in the drawing but it will be evident to those skilled in the art that any convenient source of energy, such as the battery 27, may be used without departing from my invention in its broader aspects. Contacts 36 and 39 are then connected to the other side of the source chosen and as shown in the drawing from the other side of exciter 4. Contacts 34 and 40 are connected to one terminal of winding 19 and contacts 35 and 38 are connected to the other terminal of winding 19.

The arrangement of the relay just described permits coil 19 to be energized by a current in one direction or the other depending upon the operative position of the core 24 of relay 23. With an impulse of current in coil 25 due to a change of load on generator 1 the balance between core 24 and spring 28 is disturbed and connections are made in such a way that when the load is increased the contacts 8 and 9 are brought into engagement and resistance 6 short circuited. On the other hand, if the load is reduced contacts 8 and 9 are separated and resistance 6 is placed in circuit.

While we have shown and described particular embodiments of our invention, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States is:

1. In combination, a dynamo-electric machine, an excitation circuit therefor, a regulator comprising vibratory contacts for controlling said excitation circuit, and means responsive to an impulse of current induced in said excitation circuit by a change of load on said dynamo-electric machine for staying the motion of said contacts.

2. In combination, a synchronous dynamo-electric machine, an excitation circuit therefor, a regulator comprising vibratory contacts for controlling said excitation circuit, means responsive to an electrical characteristic of said excitation circuit for vibrating one of said contacts, and means responsive to the electrical transient in said excitation circuit occasioned by a sudden change of load on said synchronous dynamo-electric machine for modifying the action of said first mentioned means to stay the motion of said contacts.

3. In combination, a distribution circuit, a synchronous generator for supplying electrical energy thereto, a field circuit for said generator, an electromagnetic device for controlling the energization of said field circuit, and means connected to said field circuit and to said electromagnetic device and arranged to be responsive to an electrical transient occasioned by an electrical disturbance in said distribution circuit for modifying the operation of said electromagnetic device.

4. In combination, a synchronous dynamo-electric machine comprising stator and rotor circuits, a regulator comprising cooperating contact members for controlling an electrical characteristic of said rotor circuit substantially to maintain an electrical characteristic of said synchronous machine at a predetermined value, means for varying the relative position of said contact members, and means responsive to the current transient induced in said rotor circuit by a change of current in said stator circuit for staying the normal vibrating motion of said contact members for a period of time sufficient to restore the electrical characteristic of said synchronous machine to substantially said predetermined value.

5. In a system of distribution, a synchronous dynamo-electric machine, an excitation circuit therefor, means comprising a vibratory regulator having cooperating contacts for controlling an electrical characteristic of said excitation circuit to maintain an electrical characteristic of said synchronous machine at a predetermined value, and an inductance device connected to be responsive to the current transient induced in said excitation circuit upon a change of load on said synchronous machine for prolonging the engagement or disengagement of said contacts until the electrical characteristic of said excitation circuit has an average value sufficient to maintain said electrical characteristic of said synchronous machine at a predetermined value.

6. In combination, a synchronous dynamo-electric machine comprising an armature winding and a field winding, means comprising a regulator for controlling the voltage of said field winding to control the voltage of said synchronous machine, a winding connected to actuate said regulator in accordance with an electrical characteristic of said field winding, a second winding operatively associated with said first winding, and means connected in said excitation circuit to be responsive to electrical transients induced therein by a change in an electrical characteristic in said armature winding for controlling the energization of said second winding.

7. In combination, a synchronous dynamo-electric machine, an excitation circuit therefor, means comprising a regulator having cooperating contacts for controlling the voltage of said excitation circuit to control the voltage of said synchronous machine, an electromagnet comprising an operating winding for vibrating said contacts, an additional winding operatively associated with said operating winding, and a transformer connected in series relation with said excitation circuit and arranged to vary the excitation of said additional winding for modifying the action of said contacts in accordance with the current transient induced in said excitation circuit upon the occurrence of a change of current in said synchronous machine.

8. In combination, a synchronous dynamo-electric machine, an excitation circuit therefor, a pair of cooperating contacts arranged to control an electrical characteristic of said excitation circuit, a winding connected to be responsive to an electrical characteristic of said excitation circuit for vibrating one of said contacts, and means operative in response to the current transient induced in said excitation circuit for acting differentially with said winding when said synchronous machine is subjected to a sudden increment of load and for acting accumulatively with said winding when said synchronous machine is subjected to a sudden decrement of load.

9. In combination, a synchronous dynamo-electric machine, an excitation circuit therefor, a pair of cooperating contacts arranged to control an electrical characteristic of said excitation circuit, a winding connected to be responsive to an electrical characteristic of said excitation circuit for vibrating one of said contacts, and a winding associated with said first mentioned winding and connected to be energized to act differentially therewith when said synchronous machine is subjected to a sudden increment of load and to act accumulatively therewith when said machine is subjected to a sudden decrement of load.

10. In combination, a synchronous dynamo-electric machine, an excitation circuit therefor, a pair of cooperating contacts arranged to control the current in said excitation circuit, a winding connected to be responsive to the voltage of said excitation circuit for vibrating one of said contacts, a second winding associated with said first mentioned winding, an inductive device in series relation with said excitation circuit for energizing said second winding in a direction to act differentially with said first mentioned winding when said synchronous machine is subjected to a sudden increment of load and to act accumulately with said first mentioned winding when said synchronous machine is subjected to a sudden decrement of load.

11. In combination, an electric circuit, a regulating device comprising a plurality of windings for controlling an electrical characteristic of said circuit, a relay for controlling the direction of energization of one of said windings, and an inductive device connected in series relation with said circuit for controlling the operation of said relay.

12. In combination, a dynamo-electric machine, an excitation circuit therefor, a pair of cooperating contacts for controlling an electrical characteristic of said excitation circuit, a winding connected to said excitation circuit for causing vibration of one of said contacts, a second winding associated with said first mentioned winding for staying the vibratory motion of said contacts, a relay for controlling the direction of energization of said second winding, and a transformer connected in series relation with said excitation circuit for controlling the operation of said relay.

13. In combination, a synchronous dynamo-electric machine, an excitation circuit therefor, means comprising a regulator having cooperating contacts for controlling the voltage of said excitation circuit to maintain the voltage of said synchronous machine at a predetermined value, electromagnetic means comprising two windings for actuating one of said contacts, one of said windings being connected to be responsive to the voltage of said excitation circuit for vibrating said contacts, a relay having two operative positions and comprising contact members for changing the direction of energization of the other winding of said electromagnetic means, a core for said relay arranged to actuate said contact members, means for biasing said contact members to a position intermediate its said operative positions, and inductive means connected to be responsive to current transients induced in said excitation circuit upon a change of load on said synchronous machine for actuating said relay to one or the other of its operative positions.

In witness whereof, we have hereunto set our hands this fifth day of January, 1928.

FRED. H. CLOUGH.
HENRY W. TAYLOR.